United States Patent [19]

Wengrovius

[11] Patent Number: 4,533,503

[45] Date of Patent: Aug. 6, 1985

[54] ALUMINUM BIS(ALKYLSILOXIDE)ACETOACETONATE

[75] Inventor: Jeffrey H. Wengrovius, Scotia, N.Y.

[73] Assignee: General Electric Company, Schenectady, N.Y.

[21] Appl. No.: 621,304

[22] Filed: Jun. 15, 1984

Related U.S. Application Data

[62] Division of Ser. No. 520,974, Aug. 8, 1983, Pat. No. 4,489,199.

[51] Int. Cl.³ ............................................... C07F 5/06
[52] U.S. Cl. ...................................... 556/173; 556/175; 556/184
[58] Field of Search ......... 260/448 AD, 448 B, 448 R

[56] References Cited

U.S. PATENT DOCUMENTS 3,041,380  6/1962  Lacey .......................... 260/448 AD
3,580,938  5/1971  Kroll .............................. 260/448 B
4,434,103  2/1984  Interrante ........................ 260/448 B

OTHER PUBLICATIONS

Mehrotra et al., Metal B–Diketonates and Allied Der. Academic Press, N.Y. pp. 28–29 (1978).
Chemical Abstracts 72 18009f (1970).
Patterson, J. Amer. Chem. Soc. 81 pp. 4213–4217 (1959).
Borisov et al., Organosilicon Heteropolymers & Heterocompounds, Plenum Press, N.Y. p. 293 (1970).

*Primary Examiner*—Helen M. S. Sneed
*Attorney, Agent, or Firm*—William A. Teoli; James C. Davis, Jr.; James Magee, Jr.

[57] ABSTRACT

One packages, room temperature vulcanizable organopolysiloxane compositions are provided having aluminum complex as a condensation catalyst. The room temperature vulcanizable organopolysiloxane compositions exhibit improved stability over an extended shelf period and have short tack-free times.

4 Claims, No Drawings

ALUMINUM BIS(ALKYLSILOXIDE)ACETOACETONATE

CROSS REFERENCE TO RELATED APPLICATIONS

This application is a division of application Ser. No. 520,974, filed Aug. 8, 1983 now U.S. Pat. No. 4,489,199.

Reference is made to my copending application Ser. No. 520,978, for Method for Making Alkoxy Terminated Polydiorganosiloxanes, filed Aug. 8, 1983, now abandoned and John J. Dziark, for Scavengers for One Component Alkoxy Functional RTV Compositions and Process, Ser. No. 349,695, filed Feb. 17, 1982, where both applications are assigned to the same assignee as the present invention, and incorporated herein by reference.

BACKGROUND OF THE INVENTION

Prior to the present invention, various one and two-package moisture curable room temperature vulcanizable (RTV) compositions were available based on the use of a silanol-terminated polydiorganosiloxane having the formula,

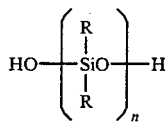

$$HO + \begin{pmatrix} R \\ | \\ SiO \\ | \\ R \end{pmatrix}_n H \quad (1)$$

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, hydrogen and mixtures thereof, and n is an integer having a value of from about 50 to about 2500, with a cross-linking silane having hydrolyzable radicals attached to silicon.

For example, Ceyzeriat, U.S. Pat. No. 3,133,891 and Bruner, U.S. Pat. No. 3,035,016, are based on the use of methyltriacetoxysilane with a silanol-terminated polydimethylsiloxane under substantially anhydrous conditions. Although the one-package compositions of Bruner or Ceyzeriat, upon exposure to atmospheric moisture, provide satisfactory one-package room temperature vulcanizable organopolysiloxane compositions exhibiting satisfactory tack-free time, for example, 30 minutes or less after an extended shelf period, the acetic acid by-product is corrosive and has a disagreeable odor. Other variations of one-package acyloxy acid generating RTV s are shown by Kulpa, U.S. Pat. No. 3,296,161, Goossens, U.S. Pat. No. 3,296,195 and Beers, U.S. Pat. No. 3,438,930, assigned to the same assignee as the present invention. Additional one-package acyloxy acid generating RTV compositions are shown by Schulz et al, U.S. Pat. No. 3,647,917 and Nitzsche et al U.S. Pat. No. 3,886,118.

An improved, low odor, substantially non-corrosive one-package RTV composition is shown by Beers, U.S. Pat. No. 4,257,932, assigned to the same assignee as the present invention. Beers achieves a reduction in odor and corrosive properties by utilizing as a cross-linking silane a less volatile material such as methyltris-(2-ethylhexanoxy)silane.

A non-corrosive two package moisture curable organopolysiloxane composition free of carboxylic acid generating groups is shown by Nitzsche et al, U.S. Pat. No. 3,127,363 which is based on the use of a polyalkoxysilane, or polysilicate cross linking agent, in place of methyltriacetoxysilane. The ingredients of the two package non-corrosive composition of Nitzsche et al, are mixed under atmospheric conditions and the resulting composition must be used soon after the ingredients are mixed because the resulting blend has a short shelf life. Although the mixture of Nitzsche et al, which is typically polyalkoxysilane, silanol-terminated polydiorganosiloxane and tin soap catalyst, provides upon mixing, a fast curing non-corrosive room temperature vulcanizable composition, the Nitzsche et al mixture does not have the extended shelf life advantage of the one-package system which is required for commercial use and therefore is excluded from a variety of applications.

Nitzsche et al, U.S. Pat. No. 3,065,194, teaches that a mixture of an endblocked dimethylsiloxane polymer, such as hydroxy and alkoxy endblocked, inert filler, ethylorthosilicate and dibutyltindilaurate can be vulcanized upon contact with water, after a 14 day shelf period at room temperature. However, the various ingredients of the mixture have to be vigorously dried by heating for 1 hour at 200° C., and the RTV, after a relatively short shelf period, has to be drenched with water.

Improved results toward combining the advantages of a non-corrosive acid-free polyalkoxysilane cross-linking agent with a silanol-terminated polydiorganosiloxane as a one-package system are shown by Weyenberg, U.S. Pat. No. 3,334.067, Cooper et al, U.S. Pat. No. 3,542,901 and by Smith et al, U.S. Pat. Nos. 3,689,454, and 3,779,986, the last two being assigned to the same assignee as the present invention, utilizing a titanium chelate catalyst in place of a tin catalyst. However, after room temperature vulcanizable one-package systems based on a titanium chelate catalyst were allowed to age for a period of 5 hours or more, it was found that the tack-free time of the aged RTV was considerably longer than the tack-free time of the same mixture after it was initially mixed and immediately exposed to atmospheric moisture.

As shown by Brown et al U.S. Pat. No. 3,122,522, a platinum catalyst is used to prepare an alkoxy terminated silalkylenepolysiloxane polymer. However, this method of synthesizing the base polymer requires an expensive hydrosilylation procedure. Additional efforts to achieve a desirable non-corrosive, substantially odor-free stable one-package RTV based on the use of polyalkoxyorganopolysiloxane in a more economic manner are shown by Brown et al, U.S. Pat. No. 3,151,514 or U.S. Pat. No. Re. 29,760. Brown et al employed a polyalkoxy end blocked polysiloxane which was based on the use of a mineral acid generating polyalkoxyhalosilane, and a curing catalyst. However, these compositions were found to be unusable because they failed to cure in contact with a tin catalyst, even in the presence of moisture.

As utilized hereinafter, the term "stable" as applied to the one-package polyalkoxy-terminated organopolysiloxane RTV's of the present invention means a moisture curable mixture capable of remaining substantially unchanged while excluded from atmospheric moisture and cures to a tack-free elastomer after an extended shelf period.

The present invention is based on the discovery that stable, substantially acid-free, one-package, moisture curable organopolysiloxane RTV compositions can be made by using an aluminum complex having the formula $$(G)_a Al(Q)_{3-a} \quad (2)$$

as a condensation catalyst with silanol terminated, or alkoxy terminated polydiorganosiloxane, in place of tin compounds or titanium chelates as previously discussed, where G is a monovalent radical selected from the class consisting of $-OR^1$, $-OSi(R^1)_3$, $-N(R^1)_2$ and $-SR^1$, $R^1$ is a monovalent radical selected from $C_{(1-13)}$ hydrocarbon radicals and substituted hydrocarbon radicals, or G can be a divalent radical of the formula, $$-D-Z-D-,$$

D is a divalent radical selected from $-O-$, $-N-$ and $-S-$ and mixtures thereof, Z is a divalent radical selected from $C_{(6-13)}$ arylene and $C_{(1-8)}$ alkylene, and when D is $-O-$, Z also can be

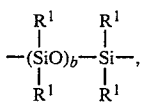

where b has a value of 0 to 5 inclusive, Q is a monovalent anion selected from

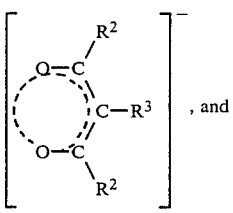, and

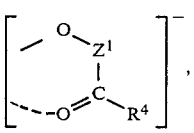, $Z^1$ is a divalent radical selected from $C_{(6-13)}$ aromatic hydrocarbon radicals, and substituted $C_{(6-13)}$ aromatic hydrocarbon radicals, $R^2$ and $R^3$ are the same or different monovalent radicals selected from hydrogen, $R^1$, $-OR^1$, $OSi(R^1)_3$, acyl and nitrile $R^4$ is a monovalent radical selected from hydrogen, $R^1$ and $OR^1$ and a is a whole number equal to 0 to 3 inclusive.

The cross-linking polyalkoxysilane which can be utilized in combination with the above-described aluminum complex of the present invention and the silanol terminated or alkoxy terminated polydiorganosiloxane has the formula, $$(R^5O)_{4-c}\overset{\underset{\displaystyle (R^1)}{|}}{Si}, \quad (3)$$

where $R^1$ is as previously defined, $R^5$ is a $C_{(1-8)}$ aliphatic organic radical selected from alkyl radicals, alkylether radicals, alkylester radicals, alkylketone radicals and alkylcyano or a $C_{(7-13)}$ aralkyl radical and c is a whole number equal to 0 or 1.

Polyalkoxy terminated organopolysiloxane which can be used to make the RTV compositions of the present invention has the formula,

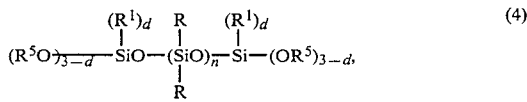

where R, $R^1$, $R^5$, and n are as previously defined and d is a whole number equal to 0 to 2 inclusive. The polyalkoxy terminated organopolysiloxane of formula (4) can be made by various procedures. One procedure is taught by Cooper et al U.S. Pat. No. 3,542,901 involving the use of a polyalkoxysilane with a silanol-terminated polydiorganosiloxane in the presence of an amine catalyst. A second procedure is shown in the copending application of Mary Ann White et al, Ser. No. 277,524, filed June 26, 1981, utilizing an alkoxy silane scavenger as an end-capper with silanol terminated polydiorganosiloxane of formula (1). Another procedure is shown in my copending application Ser. No. 520,978, filed Aug. 8, 1983, now abandoned utilizing silanol terminated polydiorganosiloxane of formula (1), polyalkoxysilane of formula (3) and an effective amount of the aluminum complex of formula (2).

It has been further found that improved cure rates can be achieved if minor amounts of amines, substituted guanidines, or mixtures thereof, are utilized as curing accelerators in the polyalkoxy compositions of the present invention. There can be used from 0.1 to 5 parts, and preferably from about 0.3 to 1 part of curing accelerator, per 100 parts of the silanol-terminated polymer of formula (1), or 100 parts of the polyalkoxy-terminated polymer of formula (4) to substantially reduce the tack-free time (TFT) of the RTV composition of the present invention. This enhanced cure rate is maintained after it has been aged for an extended shelf period, for example, 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

STATEMENT OF THE INVENTION

In one aspect of the present invention, there is provided room temperature vulcanizable organopolysiloxane compositions comprising by weight,
  (A) 100 parts of a silanol terminated polydiorganosiloxane,
  (B) 0.1 to 10 parts of polyalkoxysilane,
  (C) 0 to 10 parts of curing accelerator selected from amines, silazanes, guanidines, or mixture thereof and
  (D) an effective amount, or preferably 0.1 to 10 parts of aluminum complex of formula (2).

An additional aspect of the present invention is directed to room temperature vulcanizable organopolysiloxane compositions comprising by weight,
  (a) 100 parts of alkoxy terminated polydiorganosiloxane,
  (b) 0 to 10 parts of polyalkoxysilane,
  (c) 0 to 10 parts of curing accelerator selected from amines, guanidines and silazanes or mixture thereof and (d) an effective amount of aluminum complex of formula (2).

It has been further found that alkoxy-terminated polydiorganosiloxane of formula (4), where a is 2, is preferably used in combination with 0.1 to 10 parts of polyalkoxysilane of formula (3) per 100 parts of the alkoxy terminated polydiorganosiloxane in making the RTV composition of the present invention.

Radicals included within R and $R^1$ of formulas (1), (2), (3) and (4) are, for example, aryl radicals and halogenated aryl radicals, such as phenyl, tolyl, xylyl, chlorophenyl, naphthyl; aralkyl radical such as benzyl; cycloaliphatic radicals, for example, cyclohexyl, cyclobutyl; aliphatic radical such as alkyl and alkenyl radicals, for example methyl, ethyl, propyl, chloropropyl, vinyl, allyl, trifluoropropyl; and cyanoalkyl radicals, for example, cyanoethyl, cyanopropyl, cyanobutyl. A previously indicated, R in formula (1) also can be hydrogen as part of a mixture having up to 50 mole percent hydrogen based on total moles of R radicals. Radicals included within $R^2$, $R^3$ and $R^4$ of formula (2) are, for example, hydrogen, $C_{(1-8)}$ alkyl radicals such as methyl, ethyl, propyl, butyl; alkoxy radicals such as methoxy, ethoxy, propoxy, butoxy; $C_{(6-13)}$ aryl and aryloxy radical such as phenyl, tolyl, xylyl, phenoxy, cresoxy and $CF_3$.

Radicals included within $R^5$ of formulas (3) and (4) are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. In formulas (1)–(4), where $R$–$R^5$ can be more than one radical, these radicals can be the same or different.

Some of the aluminum complexes included within formula (2) are, for example,
aluminum di(methoxide)ethylacetoacetonate;
aluminum methoxide di(ethylacetoacetonate);
aluminum di(isopropoxide)acetylacetonate;
aluminum di(isopropoxide)ethylacetoacetonate;
aluminum isopropoxide di(acetylacetonate);
aluminum isopropoxide di(ethylacetoacetonate);
aluminum bis(trimethylsiloxide)ethylacetoacetonate;
aluminum bis(dimethoxymethylsiloxide)ethylacetoacetonate;
aluminum bis(dimethoxymethylsiloxide)acetylacetonate;
aluminum tri(ethylacetoacetonate);
aluminum bis(dimethylamino)ethylacetoacetonate;
aluminum 1,3-propanedioxide ethylacetoacetonate; and
aluminum di(isopropoxide)(methylsalicylate).

A typical procedure for preparing the aluminum complexes included within formula (2) preferably involves the careful addition of 1 or 2 equivalents of the chelate ligand such as acetylacetone or ethylacetoacetone to a solution of aluminum triisopropoxide. The aluminum isopropoxide chelate complex can then be obtained by the removal of volatile products in vacuo. Additional procedures for making aluminum isopropoxide chelate complexes are taught by R. K. Mehrotra and R. C. Mehrotra, *Can. J. Chem.*, 39 (1961), 795–798.

The analogous methoxide complexes can be prepared by adding an excess of methanol to an aluminum isopropoxide complex. Rapid removal of volatile products results in aluminum complex containing methoxide ligands in place of the isopropoxide groups.

Aluminum trimethylsiloxide chelate complexes can be similarly prepared by adding trimethylsilanol to an aluminum isopropoxide chelate complex. Aluminum methyldimethoxysiloxide chelate complexes can be formed by reacting aluminum methoxide chelate complexes and 1,3-dimethyltetramethoxydisiloxane at elevated temperatures, such as 80°–120° C.

All of the aluminum complexes are moisture sensitive and preferably prepared under anhydrous conditions such as a drybox.

Some of the cross-linking polyalkoxysilanes included within formula (3) are, for example, methyltrimethoxysilane; methyltriethoxysilane; ethyltrimethoxysilane; tetraethoxysilane; vinyltrimethoxysilane; etc.

Among the curing accelerators which can be used in the practice of the invention are silyl substituted guanidines having the formula, $$(Z^2)_g Si(OR^1)_{4-g}, \quad (5)$$

where $R^1$ is as previously defined, $Z^2$ is a guanidine radical of the formula,

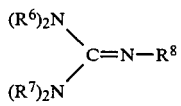

$R^8$ is divalent $C_{(2-8)}$ alkylene radical, $R^6$ and $R^7$ are selected from hydrogen and $C_{(1-8)}$ alkyl radicals and g is an integer equal to 1 to 3 inclusive. In addition, alkyl substituted guanidines having the formula,

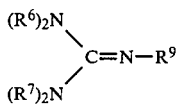

where $R^6$ and $R^7$ are as previously defined and $R^8$ is a $C_{(1-8)}$ alkyl radical, also can be employed. Some of the silyl substituted guanidines included within formula (5) are shown by Takago U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, γ-aminopropyltrimethoxysilane and methyldimethoxy-di-n-hexylaminosilane. Methyldimethoxy-di-n-hexylaminosilane acts as both a cross-linker and curing accelerator. The primary amines, secondary amines, silylated secondary amines are preferred and secondary amines, and silylated secondary amines are particularly preferred. Silylated secondary amine such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

In addition to the above-described silicon-nitrogen materials there also can be used in the practice of the present invention silicon-nitrogen compounds materials selected from (i) a silicon-nitrogen compound having the formula,

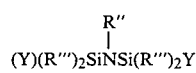

where Y is selected from R''' and R''₂N— and (ii) a silicon-nitrogen polymer comprising (1) from 3 to 100 mole percent chemically combined structural units selected from the class consisting of

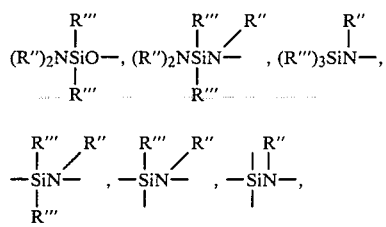

and (2) from 0 to 97 mole percent chemically combined structural units represented by the formula,

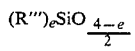

and mixtures thereof, where the silicon atoms of said silicon-nitrogen polymer are joined to each other by a member selected from an SiOSi— linkage and a SiNR'-'Si linkage, the free valences of said silicon atoms other than those joined to oxygen to form a siloxy unit and nitrogen to form a silazy unit are joined to a member selected from an R'' radical and (R'')₂N radical, and where the ratio of the sum of said R''' radicals and said (R'')₂N radicals to the silicon atoms of said silicon-nitrogen polymer has a value of 1.5 to 3 inclusive, R'' is a member selected from the class consisting of hydrogen and C$_{(1-12)}$ monovalent hydrocarbon radicals, and fluoroalkyl radicals, R''' is a member selected from hydrogen, monovalent hydrocarbon radicals and fluoroalkyl radicals, and e is a whole number equal to 0 to 3 inclusive.

Some of the above silazanes which can be used in the practice of the present invention are, for example, hexamethylcyclotrisilazane, octamethylcyclotetrasiloxane, trimethyltriphenylcyclotrisilazane, trivinyltrimethylcyclotrisilazane, etc. Other silazanes within the scope of the above formulas are as follows:

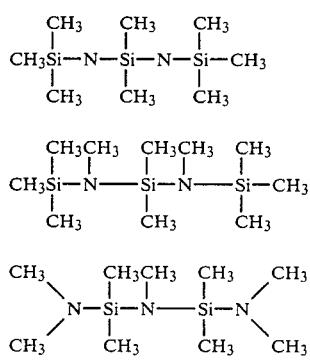

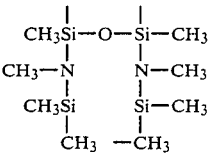

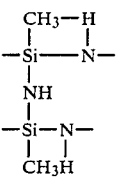

Silanol-terminated polydiorganosiloxanes of formula (1) are well known and preferably have a viscosity in the range of from about 100 to about 400,000 centipoise and more preferably from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1) also are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

In order to facilitate the cure of the RTV compositions of the present invention, the aluminum complexes can be utilized at from 0.1 to 10 part of aluminum complex per 100 parts of the silanol terminated or alkoxy terminated polydiorganosiloxane and preferably from 0.5 to 1.5 part per 100 parts of the polydiorganosiloxane.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example stirring, a mixture of materials which can consist of the silanol terminated polydiorganosiloxane consisting essentially of chemically combined polydiorganosiloxanes, or alkoxy terminated polydiorganosiloxanes along with the aluminum complex. Optionally, cross-linking polyalkoxysilane and amine accelerator can be used. The blending of the aforementioned ingredients is performed in a substantial absence of moisture.

As used hereinafter, the expressions "moisture-free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions a mixture of the silanol terminated polydiorganosiloxane or alkoxy terminated polydiorganosiloxane, filler and an effective amount of the aluminum complex. There can be added to the mixture, the cross-linking silane or mixture thereof along with other ingredients, for example the curing accelerator and pigments.

In order that those skilled in the art will be better able to practice the invention, the following example is given by way of illustration and not by way of limitation. All parts are by weight.

EXAMPLE 1

A mixture of 5 grams of a methyldimethoxy siloxy terminated polydimethylsiloxane and 0.075 gram of aluminum di(isopropoxide) ethylacetoacetonate was stirred under a nitrogen atmosphere in a dry box. The mixture was found to remain substantially stable, that is no viscosity change was observed over a period of 2 days at 100° C., or 1 year at 25° C. while it was stored under nitrogen. Upon exposure to a constant humidity chamber at a 58% relative humidity, the sample became tack-free in less than 200 minutes.

EXAMPLE 2

A mixture of 20 grams of the methyldimethoxy terminated polydimethylsiloxane of Example 1, 0.3 gram of aluminum isopropoxide di(ethylacetoacetonate) was agitated under a nitrogen atmosphere for 15 minutes. The resulting composition was then divided into 4 equal parts. A graduated amount of $(n-C_6H_{13})_2NH$ was then added to each part. The respective compositions were then placed in a humidity chamber following the procedure of Example 1 to determine the tack-free times "TFT" in minutes. The following results were obtained:

TABLE I

| % $(n-C_6H_{13})_2NH$ | TFT (min) |
| --- | --- |
| 0 | 60 |
| 0.5 | 50 |
| 1 | 40 |
| 2 | 35 |

The above results show that $di(n-C_6H_{13})_2NH$ is effective as an accelerator for room temperature vulcanizable compositions of the present invention, based on the use of anhydrous mixtures of alkoxy terminated polydiorganosiloxane and aluminum complex.

EXAMPLE 3

A mixture of 10 grams of the methyldimethoxy terminated polydimethylsiloxane of Example 1, 0.10 gram of aluminum di(isopropoxide) ethylacetoacetonate, 0.1 gram of $(n-C_6H_{13})_2NH$ and 0.05 gram of methyltrimethoxysilane was stirred under nitrogen. The resulting room temperature vulcanizable composition was then divided into 3 parts and heat aged for 24 and 75 hours in a water free environment. The RTV samples were then placed in a humidity chamber and the following tack-free times were observed:

TABLE II

| Time (hr) at 100° C. | TFT (min) |
| --- | --- |
| 0 | 55 |
| 24 | 150 |
| 75 | 240 |

The above results show that the aluminum complex utilized in the practice of the present invention can serve as a condensation catalyst.

The above procedure was repeated using 1.0% by weight based on the weight of the RTV composition of aluminum isopropoxide di(ethylacetoacetonate). The following tack-free times were observed:

TABLE III

| Time (hr) at 100° C. | TFT (min) |
| --- | --- |
| 0 | 55 |
| 24 | 80 |
| 75 | 180 |

Identical formulations catalyzed by these same aluminum condensation catalysts did not exhibit any change in tack-free times after 14 months storage at 25° C.

The above results further demonstrate the stability of the room temperature vulcanizable compositions of the present invention.

EXAMPLE 4

A room temperature vulcanizable composition was prepared by thoroughly mixing under nitrogen 10 grams of a silanol terminated polydimethylsiloxane with a solution of 0.18 gram of aluminum bis(trimethylsiloxy)ethylacetoacetonate in 0.2 gram of methyltrimethoxysilane. The mixture was found to be stable over a period of 4 days at a temperature of 25° C., based on the fact that no change in viscosity had been observed. The RTV was then exposed to atmospheric moisture and it became tack-free in 50 minutes.

EXAMPLE 5

A solution of 0.14 gram of aluminum isopropoxide di(bisethylacetoacetonate), 0.072 gram of methyltrimethoxysilane and 0.05 gram of (n-C$_6$H$_{13}$)$_2$NH was thoroughly mixed under nitrogen with 5 grams of silanol-terminated polydimethylsiloxane having a viscosity of 3500 centipoise at 25° C. The resulting RTV composition was then divided into two parts and subjected to accelerated aging at 100° C. for 24 and 48 hours under substantially anhydrous conditions. The following results were obtained when the samples were placed in constant humidity chamber:

TABLE III

| Time (hr) at 100° C. | TFT (min) |
|---|---|
| 0 | 15 |
| 24 | 45 |
| 48 | 70 |

The above results further demonstrate the effectiveness of aluminum complexes in combination with amine accelerators cross-linking silanes to provide useful RTV compositions in accordance with the practice of the present invention.

EXAMPLE 6

A mixture of 100 grams of methyldimethoxy end-stopped polydimethylsiloxane having a viscosity of 120,000 centipoise at 25° C., 1 gram of (C$_6$H$_9$)$_2$NH and 0.5 gram of aluminum di(methoxide)ethylacetoacetonate was thoroughly mixed in a Semco mixer under substantially anhydrous conditions. Additional room temperature vulcanizable compositions were prepared following the same procedure utilizing 1 gram and 1.5 gram respectively of aluminum di(methoxide)ethylacetoacetonate. The various RTV's were then heat aged in toothpaste tubes for 48 hours in an oven at 100°±10° C. The RTV's were then exposed to a 58% relative humidity atmosphere to obtain tack-free times in minutes. The following results were obtained where "aluminum complex" is aluminum di(methoxide)ethylacetoacetonate and TFT's are in minutes:

TABLE IV

| % by Weight of Aluminum Complex | 0.5 | 1.0 | 1.5 |
|---|---|---|---|
| TFT, (min) at t = 0 | 40 | 45 | 45 |
| TFT at t = 5 h at 100° C. | 45 | 50 | 50 |
| TFT at t = 24 h at 100° C. | 50 | 65 | 65 |
| TFT at t = 48 h at 100° C. | 50 | 65 | 70 |
| TFT at t = 1 year at 25° C. | — | 60 | — |

The above procedure was repeated except that there was used aluminum methoxide di(ethylacetoacetonate) as a condensation catalyst. The following results were obtained:

TABLE V

| % by Weight of Aluminum Complex | 0.5 | 1.0 | 1.5 |
|---|---|---|---|
| TFT, (min) at t = 0 | 55 | 40 | 55 |
| TFT at t = 5 h at 100° C. | 55 | 40 | 55 |
| TFT at t = 24 h at 100° C. | 80 | 65 | 90 |

TABLE V-continued

| % by Weight of Aluminum Complex | 0.5 | 1.0 | 1.5 |
|---|---|---|---|
| TFT at t = 48 h at 100° C. | 70 | 50 | 85 |
| TFT at t = 1 year at 25° C. | — | 60 | — |

The above results show that aluminum methoxide ethylacetoacetonate complexes can be used as condensation catalysts for alkoxy terminated polydiorganosiloxanes which can be further used in combination with amine accelerators. Additional RTV's containing a level of from 0 to 1.5% of HN(C$_4$H$_9$)$_2$ showed that an amine accelerator can be used to reduce the TFT of the RTV when used over a range of from 0 to 1.5% by weight while holding the weight of the aluminum di(methoxide)ethylacetoacetonate or aluminum methoxide di(ethylacetoacetonate) constant at 1.5%, based on the weight of methyldimethoxy end-stopped polydimethylsiloxane.

EXAMPLE 7

An RTV organopolysiloxane composition was prepared by thoroughly mixing in a drybox 100 parts of a methyldimethoxy end-stopped polydimethylsiloxane having a viscosity of 3500 centipoises at 25° C., 1 part of aluminum tri(ethylacetoacetonate), 0.5 part of methyltrimethoxysilane and 0.5 part of HN(C$_4$H$_9$)$_2$ the resulting RTV composition was found to have a tack-free time of 85 minutes when it was exposed to atmospheric moisture at 50% RH. The TFT of the RTV was found to be 90 minutes after it was allowed to age for 24 hours at ambient temperatures. The RTV was then heat aged for 24 hours and 48 hours at 100° C. to produce an RTV composition having a TFT of 105 minutes after a 24 hour aging period and a TFT of 120 minutes after a 48 hour aging period.

The above results further demonstrate that aluminum tri(ethylacetoacetonate) complexes are valuable condensation catalysts and curing accelerators for room temperature vulcanizable polydiorganosiloxane composition of the present invention.

EXAMPLE 8

An RTV organopolysiloxane formulation was prepared by thoroughly mixing under anhydrous conditions 100 parts of a methyldimethoxy end-capped polydimethylsiloxane having a viscosity of about 20,000 centipoises, 1 part of the reaction product of aluminum di(methoxide)ethylacetoacetonate and 2 equivalents of 1,3-dimethyltetramethoxydisiloxane and 0.5 part of HN(C$_4$H$_9$)$_2$.

A portion of the above RTV composition cured to a tack-free state in 3 hours after it was exposed to atmospheric moisture at a 50% RH. The balance of the RTV composition was heated aged at 100° C. for 3 days. It was found that the tack-free time of the RTV was 3 hours upon exposure to atmospheric moisture.

EXAMPLE 9

The procedure of Example 9 was repeated, except that the reaction product of aluminum di(methoxide)-acetylacetonate with two equivalents of 1,3-dimethyl-tetramethoxydisiloxane was utilized as the aluminum condensation catalyst. It was found that the RTV formulation had a cure time of 2½ hours upon exposure to atmospheric moisture at 50% RH and a tack-free time of 2½ hours after it was aged for 48 hours at 100° C.

These results show that the reaction product of an aluminum methoxy chelate with a methoxy substituted disiloxane is a valuable aluminum condensation catalyst in accordance with the practice of the present invention.

EXAMPLE 10

There was added rapidly 30 grams of ethylacetoacetone to 50 grams of aluminum di(methoxide)ethylacetoacetonate and 50 ml of dry pentane. The mixture was stirred for 24 hours at 25° C. During this time, a copious amount of white precipitate formed. The mixture was then stripped of volatiles under reduced pressure. There was obtained 72 grams of a white crystalline product. The product was recrystallized from a mixture of methylene chloride and pentane at −30° C. Based on method of preparation, the product was aluminum methoxide di(ethylacetoacetonate). The identity of the product was further confirmed by field desorption mass spectrometry (m/e): 632 (M+), 503 (M+-ethylacetoacetonate). $^1$H NMR (300 MHz, $C_6D_6$, δ): 4.99 (s, 2H), 4.05 (m, 4H), 3.35 (s, 3H), 1.86 (s, 6H), 1.14 (m, 6H). $^{13}$C NMR (75.429 MHz, $C_6D_6$, δ): 186.95, 174.62, 85.26, 60.40, 44.58, 26.21, 14.50.

There is utilized 0.075 gram of aluminum methoxide di(ethylacetoacetonate) with 5 grams of a methyldimethoxy siloxy terminated polydimethylsiloxane in accordance with the procedure of Example 1. The mixture is found to be substantially stable under substantially anhydrous conditions and becomes tack-free upon exposure to moisture.

EXAMPLE 11

There was added rapidly 0.74 gram of trimethylsilanol to 1 gram of aluminum di(isopropoxide)acetylacetonate dissolved in 20 ml of pentane. The reaction mixture was stirred for ½ hour at 25° C. The mixture was then stripped of volatiles under reduced pressure. There was obtained 1.20 gram of a white crystalline product. The product was recrystallized from pentane at −30° C. Based on method of preparation, the product was aluminum bis(trimethylsiloxide)acetylacetonate. The identity of the product was further confirmed by field desorption mass spectrometry (m/e): 608 (M+). $^1$H NMR (300 MHz, $C_6D_6$, δ): 5.24 (s, 1H), 1.88 (s, 3H), 1.65 (s, 3H), 0.47 (s, 9H), 0.45 (s, 9H). $^{29}$Si NMR (59.59 MHz, $C_6D_6$, δ): 13.73 (s, 1Si), −1.73 (s, 1Si).

In accordance with the procedure of Example 1, the aluminum bis(trimethylsiloxide)acetylacetonate was found to be an effective catalyst for making a moisture curable room temperature vulcanizable composition when utilized with the methyldimethoxy siloxy terminated polydimethylsiloxane of Example 1.

EXAMPLE 12

There was dissolved 1 gram of aluminum di(methoxide)ethylacetoacetonate and 2.08 grams of 1,3-dimethyltetramethoxydisiloxane in 5 ml of toluene. The solution was heated to 110° C. for 3 days in a sealed tube. Quantitative GC analysis of the reaction mixture indicated that greater than 95% of methyltrimethoxysilane had formed. Volatiles were removed under vacuum from the resulting mixture. There was obtained 1.95 gram of a colorless oil. Based on method of preparation the product was aluminum bis(dimethoxymethylsiloxide) ethylacetoacetonate. The identity of the product was further confirmed by field desorption mass spectrometry (m/e): 796 (M+). $^1$H NMR (90 MHz, $C_6D_6$, δ): 5.17 (s, 1H), 3.91 (m, 2H), 3.59 (s, 6H), 3.54 (s, 6H), 2.02 (s, 3H), 1.41 (m, 3H), 0.49 (s, 3H), 0.40 (s, 3H).

Although the above examples are directed to only a few of the very many variables which can be used to make the RTV compositions of the present invention, it should be understood that the present invention is directed to the use of a much broader variety of aluminum complexes of formula (2) in combination with the silanol terminated polydiorganosiloxane of formula (1) and the alkoxy terminated polydiorganosiloxane of formula (3) as well as the amine accelerators as shown in the description preceding these examples.

What I claim as new and desire to secure by Letters Patent of the United States is:

1. An aluminum bis(alkylsiloxide)acetoacetonate selected from the class consisting of aluminum bis(trimethylsiloxide) ethylacetoacetonate, aluminum bis(dimethoxymethylsiloxide) ethylacetoacetonate and aluminum bis(dimethoxymethylsiloxide) acetylacetonate 2. Aluminum bis(trimethylsiloxide)ethylacetoacetonate.

3. Aluminum bis(dimethoxymethylsiloxide)ethylacetoacetonate.

4. Aluminum bis(dimethoxymethylsiloxide)acetylacetonate.

* * * * *